United States Patent [19]

Nantau

[11] 3,910,628

[45] Oct. 7, 1975

[54] RETRACTABLE ROOF CLOSURE

[75] Inventor: Wayne E. Nantau, Fraser, Mich.

[73] Assignee: General Motors Corporation, Detroit, Mich.

[22] Filed: May 23, 1974

[21] Appl. No.: 472,517

[52] U.S. Cl. .................. 296/137 F; 49/214; 49/225
[51] Int. Cl.² ............................................. B60J 7/00
[58] Field of Search ......... 296/137 E, 137 F, 137 B, 296/137 R; 49/213, 214, 215, 221, 225; 280/150 C

[56] References Cited
UNITED STATES PATENTS

| | | | |
|---|---|---|---|
| 2,245,832 | 6/1941 | Simpson .......................... | 296/137 F |
| 3,453,778 | 7/1969 | Daugirdas ........................... | 49/214 |
| 3,647,258 | 3/1972 | Porsche et al. ................. | 280/150 C |
| 3,690,722 | 9/1972 | Bakewicz et al. ............... | 296/137 R |
| 3,802,125 | 4/1974 | Baker ..................................... | 49/215 |

FOREIGN PATENTS OR APPLICATIONS

| | | | |
|---|---|---|---|
| 282,836 | 6/1964 | Netherlands .......................... | 49/215 |

*Primary Examiner*—Robert J. Spar
*Assistant Examiner*—Gary Auton
*Attorney, Agent, or Firm*—H. Furman

[57] ABSTRACT

A retractable roof closure for a vehicle body having a windshield header spaced from a fixed rear roof panel to provide an unobstructed roof opening. A body reinforcement bar includes vertical legs which parallel the roof pillars of the roof panel and a base which extends transversely of the body in vertically spaced relation from the fixed roof panel. A closure panel is movable fore and aft through the space between the reinforcement bar and the fixed roof panel and has a pair of laterally spaced guide tracks thereon which cooperate with laterally spaced guide rollers on the base of the reinforcement bar to support and guide the closure panel. An L-shaped control arm is attached to the closure panel at each side thereof. Each arm includes a vertically extending leg which parallels a leg of the reinforcement bar and a roof pillar and a horizontally extending leg which mounts a pair of longitudinally spaced guide rollers for engagement within a pair of guide tracks provided on each side of the body. The inter-engagement between the guide rollers and their respective guide tracks cooperate to support the retractable closure panel and guide its movement between open and closed positions.

3 Claims, 8 Drawing Figures

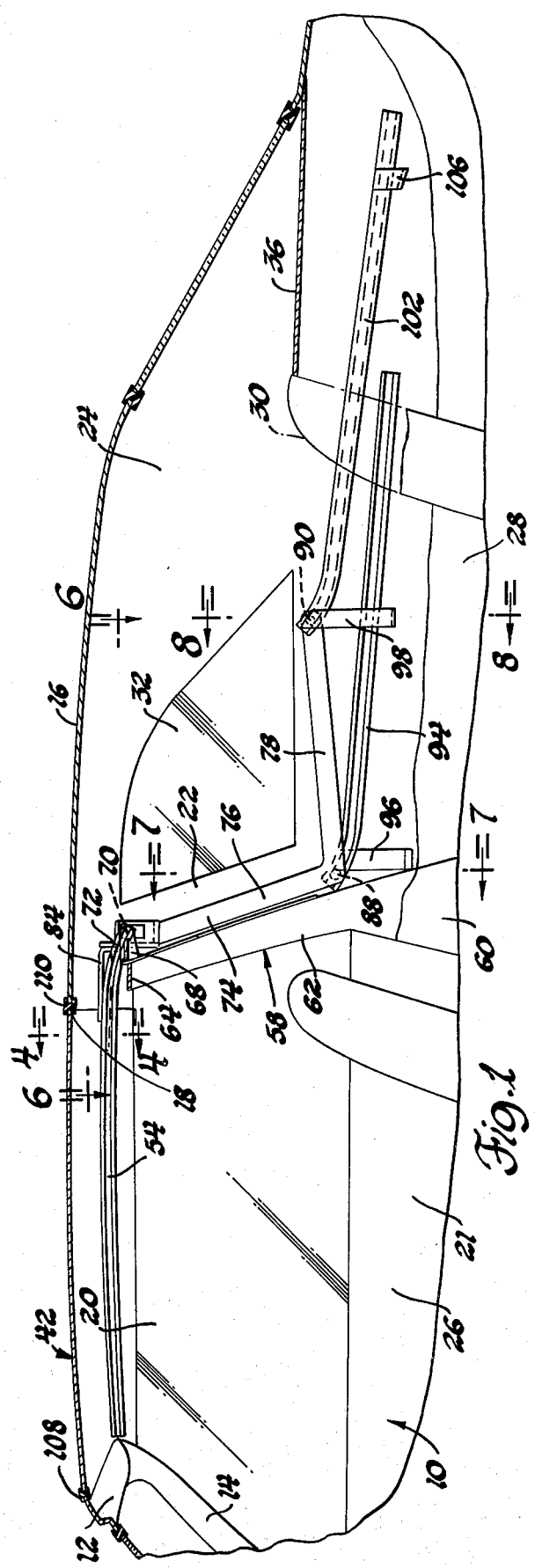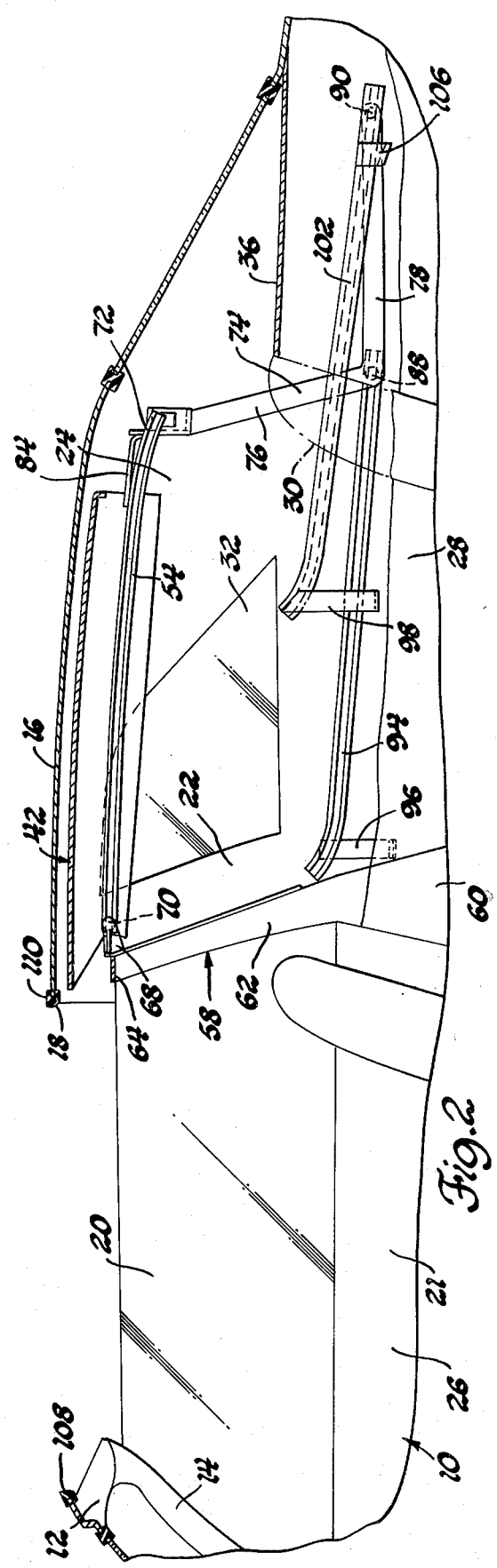

RETRACTABLE ROOF CLOSURE

The invention relates to a vehicle body and in particular to a retractable roof closure for a vehicle body roof opening.

Certain motor vehicles have an unobstructed roof opening which extends the entire width of the vehicle roof from door to door and is defined by the body windshield header and a fixed rear roof panel covering the rear portion of the passenger compartment.

This invention provides a retractable roof closure for such a roof opening which does not restrict the headroom available to occupants of the rear seat.

In a two-door vehicle body, the unobstructed roof opening is provided between the windshield header and the roof pillars at the lock pillar edges of the front doors. The fixed roof panel has its forward end supported by the roof pillars. The vehicle door windows are of the frameless type so that when the windows are open, the front passenger compartment is completely open above the belt line. A reinforcement bar includes vertical legs along the roof pillars and a base which extends transversely of the body in vertically spaced relation from the fixed roof panel. In accordance with this invention, a retractable closure panel is movable fore and aft through the space between the reinforcement bar and the fixed roof panel to selectively open and close the roof opening. A pair of laterally spaced guide tracks on the retractable closure panel cooperate with laterally spaced guide rollers on the reinforcement bar to support and guide the retractable closure panel. An L-shaped control arm is attached to the closure panel at each side thereof. Each arm includes a vertically extending leg which parallels a reinforcement bar leg and a roof pillar and a horizontally extending leg which extends rearwardly from the vertical leg and mounts a pair of longitudinally spaced guide rollers. A pair of guide tracks are provided on each side of the body extending rearwardly from a roof pillar to beneath the rear window package shelf. The inter-engagement between the guide rollers and their respective guide tracks cooperate to support the retractable closure panel and guide its movement between open and closed positions.

One feature of the invention is that it provides a retractable roof closure panael which is moved between open and closed positions with respect to an unobstructed opening between the windshield header and the forward edge of a fixed roof position.

Another feature is that the retractable roof closure panel has control arms for controlling movement of the closure panel and which are located along the sidewalls of the rear passenger compartment so as to maximize head room available for the rear seat passengers.

Another feature is that the panel moves between the fixed roof portion and a reinforcement bar including vertically extending legs which parallel the roof pillars and a transverse spanning base portion in vertically spaced relation from the fixed roof panel.

These and other features of the invention will be readily apparent from the following specification and from the drawings in which:

FIG. 1 is a fragmentary partially broken away side elevation view of a vehicle body showing the retractable roof closure of the invention in closed position;

FIG. 2 is similar to FIG. 1 but showing the retractable roof closure in open position;

Figure 3:
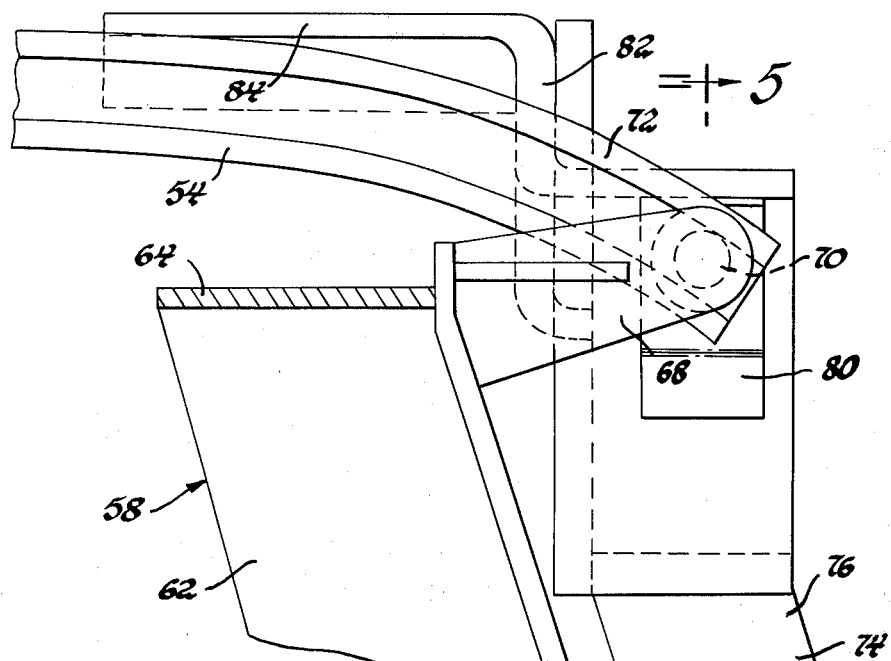
FIG. 3 is an enlarged view showing the connection between the reinforcement bar and the retractable roof closure.

Referring to FIG. 1, a two-door vehicle body indicated generally at 10 is shown, it being understood that the drawing is a sectional view taken along the longitudinal centerline of the vehicle body so as to show only that half of the retractable closure panel which is located on the passenger side of the vehicle body. It is noted that the retractable roof closure of this invention is symmetrical about the centerline of the vehicle body and while the following description undertakes to describe only that portion of the retractable roof closure which is depicted in the drawings as being on the passenger side of the vehicle body, it will be understood that identical structure, not shown, is provided on the driver side of the vehicle body.

The vehicle body 10 includes a windshield header 12 supported by a windshield pillar 14. The vehicle body also includes a fixed roof panel 16 which is spaced substantially from the windshield header 12 to provide a roof opening 18 which extends the entire width of the body from the window glass 20 of the passenger door 21 to the window of the driver door, not shown. The forward end of the fixed roof panel 16 is conventionally supported by a roof pillar 22 provided at the lock pillar edge of the door 21. The roof panel 16 includes a conventional sail panel 24 and a conventional backlite. The vehicle body 10 has a front passenger compartment 24 which is situated generally beneath the roof opening 18 and a rear passenger compartment 28 which is situated generally beneath the fixed roof panel 16 and includes a rear seat 30. The rear passenger compartment 28 includes a conventional rear quarter window 32 in the sail panel 24. A conventional package shelf 36 is provided behind the rear seat 30.

Figure 4:
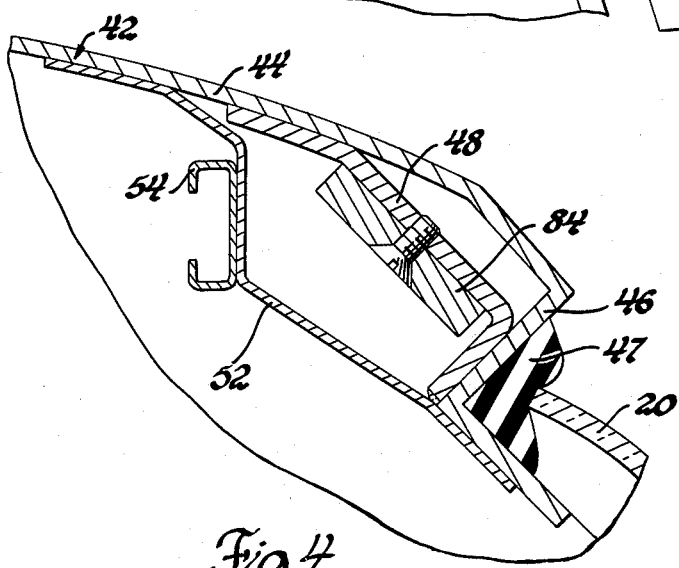
FIG. 4 is an enlarged sectional view taken in the direction of arrows 4—4 of FIG. 1.

A retractable closure panel 42 is provided for closing the opening 18 between the windshield header 12 and the forward edge of the fixed roof panel 16. As best seen in FIG. 4 the retractable closure panel 42 includes an outer panel 44 which spans the vehicle body from the window glass 20 of the passenger door 21 to the window of the driver door, not shown. The outer panel 44 has a flange structure 46 along its side edge which carries a conventional elastomeric seal 47 for providing a waterproof engagement between the window 20 and the outer panel 44. A longitudinal reinforcement 48 is welded to the outer panel 44 and to the flange structure 46. A bracket 52 is welded to flange structure 46 and outer panel 44 to mount a longitudinally extending channel shaped guide track 54 as best seen in FIGS. 1 and 4.

Figure 6:
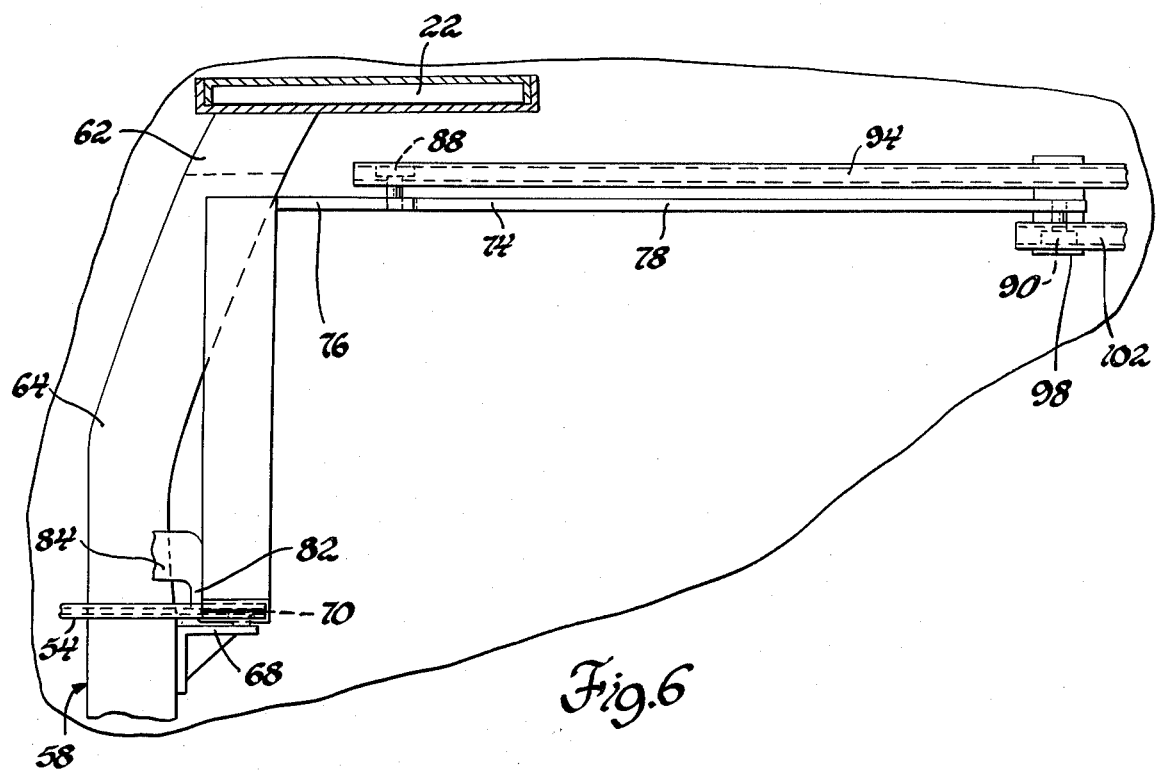
FIG. 6 is an enlarged partial plan view taken in the direction of arrows 6—6 of FIG. 1.

The vehicle body 10 is provided with a reinforcement bar 58 in the shape of an inverted U and located in spaced relationship generally parallel the roof panel 16 and roof pillar 22. The lower end portion 60 of the leg 62 of bar 58 is suitable secured to body 10. The base 64 of the reinforcement bar 58 transversely spans the vehicle body and connects the upper ends of the legs 62. The space between the base 64 and legs 62 of bar 58 and the fixed roof panel 16 and pillars 22 permits the retractable closure panel 42 to move fore and aft therebetween. As best seen in FIGS. 3 and 6 a bracket 68 extends rearwardly from the base 64 and mounts a roller 70. When the panel 42 is in closed position, FIG. 1, roller 70 is engaged within a downwardly curving rearward extending portion 72 of the guide track 54 so as to support the rearward edge of the panel 42. The forward edge of panel 42 engages the windshield header.

Figure 5:
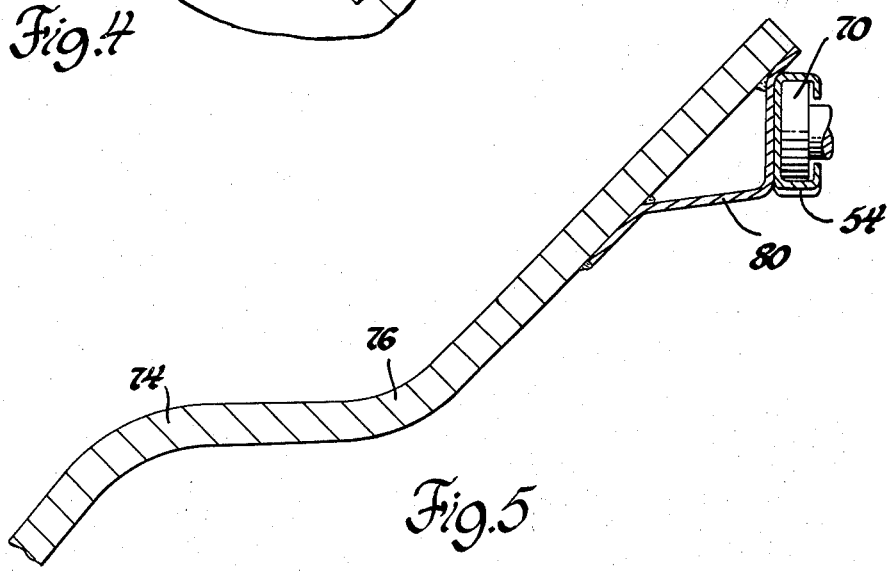
FIG. 5 is a sectional view taken in the direction of arrows 5—5 of FIG. 3.

Referring to FIG. 1, an L-shaped control arm 74 is provided to control fore and aft movement of the retractable closure panel 42. The L-shaped control arm 74 includes a vertically extending leg 76 and a rearwardly extending leg 78. The rearwardly extending leg 78 extends along side the rear passenger compartment 28 from the pillar 22 to the sail panel 24. The vertically extending leg 76 extends upwardly from the forward end of the leg 78 generally parallel to the leg 62 of the reinforcement bar 58 and the roof pillar 22. The vertically extending leg 76 is curved inwardly of the vehicle body as seen in FIGS. 5 and 6 to parallel the inward curvature roof pillar 22 and approach the guide track 54. As seen in FIG. 5, a bracket 80 connects the vertically extending leg 76 to the end of guide track 54. As seen in FIGS. 3, 4, and 6 a bracket assembly 82 is attached to the upper end of the vertical leg 76 and includes a leg 84 which extends forwardly and is conventionally fastened as by bolting to the reinforcement 48 of the retractable closure panel 42. It will be noted that this provides an integral attachment between the L-shaped control arm 74 and the retractable closure panel 42.

Figure 7:
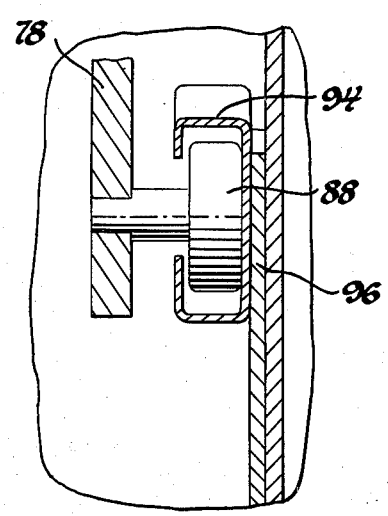
FIG. 7 is an enlarged sectional view taken in the direction of arrows 7—7 of FIG. 1.
Figure 8:
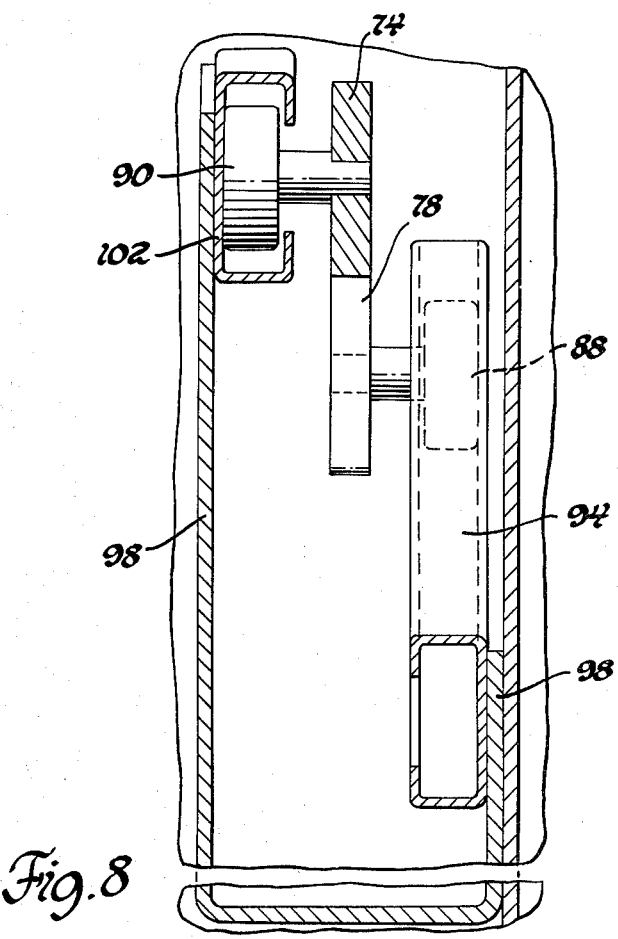
FIG. 8 is an enlarged sectional view taken in the direction of arrows 8—8 of FIG. 1.

Referring to FIGS. 6, 7 and 8 it will be seen that a roller 88 is provided on the forward end of the leg 78 of the L-shaped control arm 74 and a similar roller 90 is provided at the rearward end thereof. The roller 88 is engaged in a guide track 94 which is attached to the vehicle body by legs 96 and 98. The guide track 94 extends rearwardly from the roof pillar 22 to just behind the rear seat 30. The roller 90 at the rearward end of leg 78 is engaged in a guide track 102 which has its forward end mounted on the vehicle body by the leg 98 and its rearward end attached to the vehicle body by a leg 106. As seen in FIG. 1 the guide track 102 extends beyond the rear seat 30 and beneath the package shelf 36. The forward ends of the guide tracks 94 and 102 are curved upwardly. It will be noted that the relative elevation between the rear quarter window 32 and the leg 78 is such as to prevent the leg 78 and the tracks 94 and 102 from being visible from outside the vehicle. It will also be apparent that the tracks 94 and 102 and the control arm 74 would be appropriately covered by trim panels in the rear passenger compartment 28.

FIG. 1 shows the retractable closure panel 42 in its normal closed position in which the forward and rearward edges of the outer panel 44 respectively sealingly engage a seal 108 on the windshield header 12 and a seal 110 on the fixed roof panel 16. The retractable closure panel 42 is movable rearwardly to its open position of FIG. 2. Such movement may be initiated either manually or by a conventional cable drive system which would preferably be connected to the rearward extending leg 78 of the L-shaped control arm 74. During the initial increment of rearward movement of the retractable closure panel 42 from its closed position of FIG. 1, the retractable closure panel 42 and the control arm 74 move vertically downward by virtue of the downwardly curving rear end portion 72 of guide track 54 and the upwardly curving forward ends of the guide tracks 94 and 102. As seen in FIG. 2, when the retractable closure panel 42 is in its open position, the L-shaped control arm 74 is located behind the rear seat 30 and its rearward extending portion 78 is located beneath the package shelf 36.

It will be apparent that with the retractable closure panel 42 in its fully open position the retractable closure panel 42 will, by virtue of its relatively thin cross section as shown in FIG. 4, not result in an appreciable decrease in the amount of head room available to the rear seat occupant. At the same time it will be apparent that with the window 20 of the front door open, the passengers in the front seat will enjoy an open air environment such as in a convertible top vehicle. The reinforcement bar 58 reinforces the vehicle body and also provides a mount for the roller 70 which guides and supports the retractable closure panel 42. Thus, the invention provides an improved retractable roof closure for a motor vehicle body.

What is claimed is:

1. In a vehicle body having a passenger compartment, a fixed roof panel supported at its forward edge by roof pillars, and a windshield header spaced from the fixed roof panel to provide a roof opening, a retractable closure for selectively opening and closing the roof opening comprising: a closure panel fitting within the opening in closed position, first roller means mounted on the vehicle body rearwardly of the roof opening, first guide track means on the closure panel and extending rearwardly of the closure panel underneath the fixed roof panel into engagement with the first roller means, a pair of L-shaped control arms, each including a first leg attached to the closure panel adjacent each side thereof and depending vertically from the rearward end thereof in substantially parallel relationship with a respective roof pillar and a second leg extending rearwardly from the first leg, second and third roller means mounted in longitudinally spaced relation on the rearwardly extending second leg of each control arm, and second and third guide track means on each side of the vehicle body respectively receiving the second and third roller means, the inter-engagement of the respective roller means with the respective guide track means cooperating to support the closure panel and define the path of movement thereof between open and closed positions.

2. In a vehicle body having a passenger compartment, a fixed roof panel supported at its forward edge by roof pillars, and windshield header spaced from the fixed roof panel to provide a roof opening, a retractable closure for selectively opening and closing the roof opening comprising: a reinforcement bar including vertically extending leg portions paralleling each roof pillar and a transversely extending base portion spanning the vehicle body in vertically spaced relation from the fixed roof panel to connect the leg portions, a closure panel, guide track means mounted on the closure panel, roller means mounted on the base portion of the reinforcement bar and engaged within the guide track means to mount the closure panel for fore and aft movement through the space between the reinforcement bar and the fixed roof panel, a pair of control arms attached to and depending vertically from the rearward end of the closure panel, in parallel relationship with the roof pillars, and guide means acting between the lower end of the control arms and the vehicle body to guide movement of the control arms whereby guided movement of the control arms cooperates with movement of the closure panel mounted guide track means on the reinforcement bar mounted roller means to define the path of movement of the closure panel between open and closed position.

3. In a vehicle body having a passenger compartment, a windshield header, a fixed roof panel spaced from the windshield header to provide a roof opening, roof pillars supporting the forward end of the fixed roof panel, sail panels supporting the rear end of the fixed roof panel, and window openings defined by the sail panels and the roof pillars, a retractable closure for opening and closing the roof opening comprising, a closure panel having a forward edge for sealing to the header and the rearward edge for sealing to the fixed roof panel when the closure panel is in closed position, guide track means mounted on the closure panel, roller means mounted on the vehicle body and engaged within the guide track means, control arms having their upper ends attached to the closure panel adjacent the rearward edge thereof and depending vertically therefrom in substantially parallel relationship with the roof pillars, and guide means on the vehicle body below the window openings coacting with the lower ends of the control arms to guide movement of the control arms between a forward position wherein the control arms are adjacent the roof panel and a rearward position wherein the control arms are located adjacent the sail panels and rearward of the roof opening, the guided movement of the control arms cooperating with movement of the closure panel guide track means relative to the body mounted roller means to define the path of movement of the closure panel between open and closed positions.

* * * * *